United States Patent [19]

Weinstock

[11] 3,852,462
[45] Dec. 3, 1974

[54] THIOLPULVINIC ACID DERIVATIVES
[75] Inventor: Joseph Weinstock, Phoenixville, Pa.
[73] Assignees: Smithkline Corporation, Philadelphia, Pa.
[22] Filed: Aug. 30, 1973
[21] Appl. No.: 393,236

Related U.S. Application Data
[62] Division of Ser. No. 267,762, June 30, 1972, Pat. No. 3,780,064.

[52] U.S. Cl. ............................................. 424/279
[51] Int. Cl........................................... A61u 27/00
[58] Field of Search .................................... 424/279

[56] References Cited
UNITED STATES PATENTS
3,676,464   7/1972   Foder et al. ..................... 260/343.3

Primary Examiner—Stanley J. Friedman
Attorney, Agent, or Firm—William H. Edgerton; Joseph A. Marlino; Richard D. Foggio

[57] ABSTRACT

Thiolpulvinic acid derivatives having anti-arthritic activity prepared by treating the corresponding pulvinic acid dilactone with an active derivative of the appropriate mercaptan.

2 Claims, No Drawings

THIOLPULVINIC ACID DERIVATIVES

This is a division of application Ser. No. 267,762 filed June 30, 1972, which has issued into U.S. Pat. No. 3,780,064.

This invention relates to novel derivatives of thiolpulvinic acid having valuable pharmacodynamic activity. More specifically, these compounds possess anti-arthritic activity and at anti-arthritic doses they further produce analgesic and antipyretic activity.

The compounds of this invention are represented by the following general structural formula:

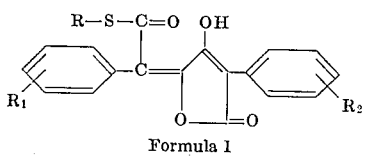

Formula I wherein:

R represents lower alkyl of from 1 to 4 carbon atoms, phenyl, and benzyl; and $R_1$ and $R_2$ each represent hydrogen, chlorine, bromine, fluorine, phenyl, trifluoromethyl, methylenedioxy in adjacent positions, or lower alkyl of from 1 to 4 carbon atoms and lower alkoxy of from 1 to 4 carbon atoms.

Preferably, the compositions of this invention comprise a compound of Formula I above when R is lower alkyl and $R_1$ and $R_2$ are each hydrogen, chlorine, fluorine, lower alkyl or lower alkoxy. Most advantageously, R is methyl, $R_1$ is hydrogen or lower alkoxy, and $R_2$ is hydrogen or lower alkoxy. The substituents in the $R_2$ benzene ring are designated by a prime (').

The novel substituted thiolpulvinic acid derivatives are prepared according to the following synthetic procedure:

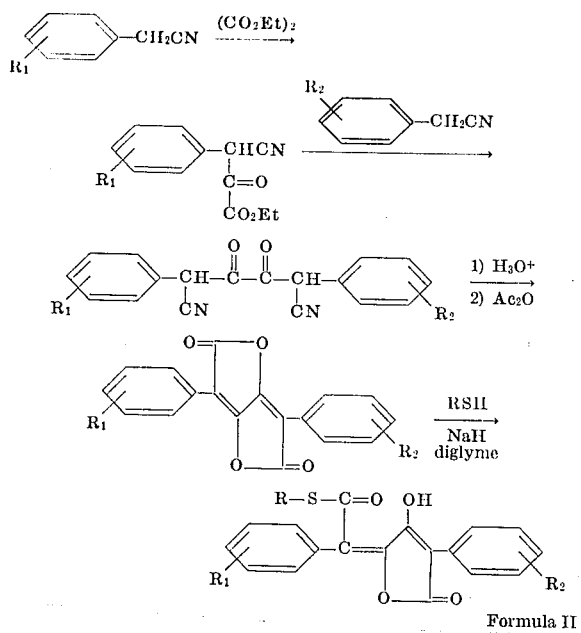

in which R, $R_1$, $R_2$ are as defined above for Formula I. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a phenylacetonitrile in an alcoholic solution of an alkali metal lower alkoxide, such as sodium methoxide or ethoxide to yield the 2,5-diphenyl-3,4-dioxoadiponitrile. The above condensations may also be carried out using a metal hydride, such as sodium hydride, in diglyme. The adiponitrile derivative is refluxed for a short period of time, for example 1 or 2 hours, in an aqueous acid solution such as water/glacial acetic acid/concentrated sulfuric acid mixture and the resulting pulvinic acid is refluxed with acetic anhydride to furnish the corresponding pulvinic acid lactone of Formula II above. The dilactone is ring opened to the thiolpulvinic acid derivative by brief refluxing with the desired mercaptan containing a metal hydride such as sodium hydride in diglyme.

When $R_1$ and $R_2$ are different in the above synthetic sequence, the ring opening of the dilactone of Formula II gives a mixture of positional isomers, namely compounds of Formula I and compounds of the following formula:

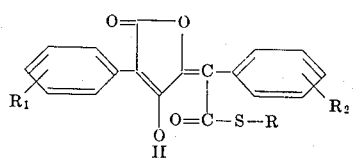

Formula III

The ratio of isomers obtained is variable and depends on the nature of $R_1$ and $R_2$. The isomers can be separated by fractional crystallization and/or chromatographic procedures. Their identity is determined from the nuclear magnetic resonance patterns of the aromatic protons. This identification can be confirmed by degradative ozonolysis.

The anti-arthritic activity of the compounds of this invention is measured by their ability to inhibit adjuvant arthritis in rats. The novel compounds of this invention produce marked inhibition of the development of adjuvant arthritis in rats at a daily oral dose of 25 mg. per kilogram of body weight. Adjuvant arthritis in rats is produced by a single injection of 0.75 mg. of Mycobacterium butyricum suspended in white paraffin (N.F.) into a hindpaw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably the compound is administered orally to an animal organism in a tablet or capsule comprising an amount sufficient to produce anti-arthritic activity. Each dosage unit will contain the active medicament in an amount of about 10 mg. to about 50 mg. Advantageously equal doses will be administered 1 to 13 times daily with the daily dosage regimen being about 10 mg. to about 150 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid, and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a surup, emulsion, soft gelatin capsule, sterile injectable liquid such as an ampule, or an aqueous or nonaqueous liquid suspension.

The following examples are not limiting but are illustrative of compounds of this invention and the procedures for their preparation. Other variations of this invention will be obvious to those skilled in the art.

EXAMPLE 1

A mixture of 117.1 g. (1.0 m.) of phenylacetonitrile and 326 ml. (2.4 m.) of ethyl oxalate is added to an ethanol solution of sodium ethoxide (prepared by dissolving 23.8 g., 1.08 g. atom of sodium in 500 ml. of absolute ethanol) and refluxed 2 hours. After cooling, diluting with 2,500 ml. of water and extracting with ether, the solution is acidified with acetic acid. The solid is removed and washed with water to give ethyl-3-cyano-3-phenylpyruvate, m.p. 127°–129° C.

Ethyl-3-cyano-3-phenylpyruvate (50.0 g., 0.23 m.) and 41.0 g. (0.35 m.) of phenylacetonitrile are added to an alcoholic solution of sodium ethylate (prepared from 13.4 g. [0.58 g. atom] of sodium and 360 ml. of absolute ethanol) and the resulting yellow solution is refluxed for 1¾ hours. The cooled solution is diluted with 700 ml. of water and acidified by slow addition of acetic acid. After further cooling in ice, the suspension is filtered and the removed solid washed with water and dried to give 2,5-diphenyl-3,4-dioxoadiponitrile, m.p. 284°–286° C. (d.).

A mixture of 30.0 g. (0.104 m.) of 2,5-diphenyl-3,4-dioxoadiponitrile in 260 ml. of water, 380 ml. of glacial acetic acid and 190 ml. of concentrated sulfuric acid is refluxed for 1 hour. The suspension is cooled, poured onto 900 ml. of ice water and the solid removed and washed to give pulvinic acid, m.p. 215°–216.5° C.

Pulvinic acid (19.0 g., 0.0616 m.) is refluxed in 250 ml. of acetic anhydride for 15 minutes. The cooled solution is stirred into 1,200 ml. of ice and water and the oily mass crystallized by stirring in 500 ml. of ethanol. The yellow solid is removed, washed with ethanol and dried to yield pulvinic acid lactone, m.p. 221.5°–223° C.

Sodium hydride, 2.88 g. (50 percent in oil) is mixed with 100 ml. of diglyme and 16.0 g. of pulvinic acid lactone. Methyl mercaptan is bubbled into the mixture until a clear solution results. The solution is diluted with water, extracted with ether and acidified with hydrochloric acid. The oily solid is filtered, washed and recrystallized from 100 ml. of acetone and water. The resulting solid is again recrystallized from acetone and water to yield thiolpulvinic acid, methyl ester having a melting point of 165°–168° C.

EXAMPLE 2

A suspension of 4.0 g. of sodium hydride in 200 ml. of diglyme is heated at room temperature for 15 minutes. To the suspension 11.0 g. of phenyl mercaptan is added with continued stirring. Pulvinic acid lactone, 32.0 g., as prepared in Example 1, is added and the mixture is gently heated on a steam bath while mixing an additional ½ hour. The mixture is diluted with water, extracted with ether and acidified with hydrochloric acid. The oily solid is filtered, washed and recrystallized from 250 ml. of acetone and water. The resulting solid is again recrystallized from acetone and water to yield thiolpulvinic acid, phenyl ester.

EXAMPLE 3

To a suspension of 2.0 g. of sodium hydride in 150 ml. of diglyme is added 6.0 g. of benzyl mercaptan. The suspension is mixed for 15 minutes at room temperature. Pulvinic acid lactone, 15.0 g. (as prepared in Example 1) is then added and the suspension is gently heated on a steam bath while mixing an additional 20 minutes. The mixture is diluted with water, extracted with ether and acidified with hydrochloric acid. The oily solid is filtered, washed and recrystallized from 250 ml. of acetone and water. The resulting solid is again recrystallized from acetone and water to yield thiolpulvinic acid, benzyl ester.

EXAMPLE 4

A mixture of 45.3 g. (0.31 m.) of p-chlorophenylacetonitrile and 107 g. (0.72 m., 99 ml.) of diethyl oxalate in an alcoholic sodium ethylate solution (prepared by dissolving 7.13 g. [0.31 g. atom] of sodium in 120 ml. of absolute ethanol) is refluxed with stirring for 2 hours. The cooled reaction mixture is diluted with 700 ml. of water, acidified with acetic acid and cooled to ice bath temperature. The resulting solid is recrystallized from aqueous methanol to give ethyl-3-cyano-3-(p-chlorophenyl)-pyruvate, m.p. 134°–135° C.

Ethyl 3-(p-chlorophenyl)-3-cyanopyruvate (40 g., 0.16 m.) and p-chlorophenylacetonitrile (49.8 g., 0.33 m.) are added to an alcoholic solution of sodium ethylate (prepared from 7.36 g. [0.32 g. atom] of sodium and 190 ml. of absolute ethanol) and the resulting solution is refluxed for 2 hours. The reaction mixture is diluted with water, acidified with acetic acid and cooled to ice bath temperature to yield 2,5-di-(p-chlorophenyl)-3,4-dioxoadiponitrile, m.p. 280° C.

A solution of 15 g. (0.042 m.) of 2,5-di-(p-chlorophenyl)-3,4-dioxoadiponitrile in a mixture of 150 ml. of water, 210 ml. of acetic acid and 105 ml. of concentrated sulfuric acid is stirred and refluxed for 2 hours. The reaction mixture is diluted with 500 ml. of water and cooled to ice bath temperature to yield 4,4'-dichloropulvinic acid, m.p. 255° C. The acid is refluxed in acetic anhydride to obtain the corresponding 4,4'-dichloropulvinic acid lactone.

A mixture of 5.6 g. of 4,4'-dichloropulvinic acid lactone and 3.0 g. of sodium hydride in 150 ml. of diglyme is gently stirred and methyl mercaptan is bubbled into the mixture until a clear solution results. The solution is diluted with water, extracted with ether and acidified with hydrochloric acid. The oily solid is filtered, washed and recrystallized from 100 ml. of acetone and water. The resulting solid is again recrystallized from acetone and water to yield 4,4'-dichlorothiopulvinic acid, methyl ester.

EXAMPLE 5

Similarly by employing m-chlorophenyl-acetonitrile in the initial reaction described in Example 4 to obtain ethyl-cyano-3-(m-chlorophenyl)-pyruvate followed by reaction with m-chlorophenylacetonitrile and the subsequent synthetic steps, there is prepared the isomeric product 3,3'-dichlorothiopulvinic acid, methyl ester.

EXAMPLE 6

A mixture of 117.1 g. (1.0 m.) of phenylacetonitrile and 326 ml. (2.4 m.) of ethyl oxalate is added to an ethanol solution of sodium ethoxide (prepared by dissolving 23.8 g. 1.08 g. atom of sodium in 500 ml. of absolute ethanol) and refluxed 2 hours. After cooling, diluting with 2,500 ml. of water and extracting with ether, the solution is acidified with acetic acid. The solid is removed and washed with water to give ethyl-3-cyano-3-phenylpyruvate, m.p. 127°–129° C.

Ethyl-3-cyano-3-phenylpyruvate 13.0 g. (0.06 m.) is slowly added to a mixture of 11.6 g. (0.06 m.) p-biphenylacetonitrile and 8.44 g. (0.18 m.) of sodium hydride in 40 ml. of diglyme at a temperature below 0° C. The mixture is permitted to warm and several drops of methanol are added to start the reaction. The mixture is allowed to stand at room temperature overnight, cooled and diluted with 150 ml. of water. The mixture is then extracted with ether and the aqueous layer is acidified with acetic acid to give 2-(4'-biphenyl)-5-phenyl-3,4-dioxoadiponitrile as a yellow solid.

A mixture of 16.9 g. of 2-(4'-biphenyl)-5-phenyl-3,4-dioxoadiponitrile in 95 ml. of water, 140 ml. of glacial acetic acid and 70 ml. of concentrated sulfuric acid is refluxed for 1 hour. The suspension is cooled, poured onto 800 ml. of ice water and the solid removed and washed to give 4'-phenylpulvinic acid.

4'-Phenylpulvinic acid (23.0 g.) is refluxed in 300 ml. of acetic anhydride for 15 minutes. The cooled solution is stirred into 1,200 ml. of ice and water and the oily mass crystallized by stirring in 500 ml. of ethanol. The brown solid is removed, washed with ethanol and dried to yield 4-phenylpulvinic acid lactone.

The lactone ring is opened by mixing it with sodium hydride in diglyme and bubbling methyl mercaptan into the mixture to yield 4'-phenylthiolpulvinic acid, methyl ester.

Similarly p-biphenylacetonitrile is reacted with ethyl oxalate to give ethyl-3-cyano-3-biphenylpyruvate which in turn is reacted with phenylacetonitrile followed by the above subsequent synthetic steps to yield 4-phenylthiolpulvinic acid, methyl ester.

EXAMPLE 7

Following the procedures outlined in Example 1, p-methoxyphenylacetonitrile is reacted with diethyl oxalate in alcoholic sodium ethoxide solution to give ethyl-3-cyano-3-(p-methoxyphenyl)-pyruvate which is then similarly reacted with phenylacetonitrile to yield 2-(p-methoxyphenyl)-5-phenyl-3,4-dioxoadiponitrile.

A solution of the adiponitrile in water, acetic acid and concentrated sulfuric acid is refluxed for 2 hours and the resulting crude mixture of 4- and 4'-methoxypulvinic acid is refluxed in acetic anhydride to give 4-methoxypulvinic acid lactone.

A suspension of 3.0 g. of sodium hydride in 200 ml. of diglyme is heated at room temperature for 15 minutes. To the suspension 8.5 g. of butyl mercaptan is added with continued stirring. 4-methoxypulvinic acid lactone, 20.0 g., is added and the mixture is gently heated with additional mixing. The mixture is diluted with water, extracted with ether and acidified with hydrochloric acid. The oily solid is filtered, washed and recrystallized from acetone and water to yield 4-methoxythiolpulvinic acid, butyl ester.

EXAMPLE 8

Similarly by employing p-ethoxyphenylacetonitrile in the initial reaction described in Example 1 to obtain 3-cyano-3-(p-ethoxyphenyl)-pyruvate followed by reaction with phenylacetonitrile and the subsequent synthetic steps, there is prepared 4-ethoxypulvinic acid lactone. The lactone ring is opened by reacting it with methyl mercaptan and sodium hydride to yield the product 4-ethoxythiolpulvinic acid, methyl ester.

EXAMPLE 9

By employing the procedures set forth in Example 1, p-fluorophenylacetonitrile is reacted with diethyl oxalate in alcoholic sodium ethoxide to give ethyl-3-cyano-3-(p-fluorophenyl)-pyruvate. The latter is reacted with phenylacetonitrile and subsequent synthetic steps yield 4-fluoropulvinic acid lactone. The lactone is ring opened with methyl mercaptan and sodium hydride to give 4-fluorothiolpulvinic acid, methyl ester.

Similarly by utilizing m-trifluoromethylphenyl acetonitrile as the initial reaction as described above, there is ultimately produced 3-trifluoromethylthiolpulvinic acid, methyl ester.

EXAMPLE 10

Following the procedures outlined in Example 1, p-methylphenylacetonitrile and diethyl oxalate are reacted in alcoholic sodium ethoxide to obtain ethyl-3-cyano-3-(p-methylphenyl)-pyruvate. The latter is reacted with p-methylphenyl acetonitrile to give 2,5-di-(p-methylphenyl)-3,4-dioxoadiponitrile.

The adiponitrile is refluxed with water, acetic acid and concentrated sulfuric acid to give 4,4'-dimethylpulvinic acid which is refluxed in turn with acetic anhydride to yield 4,4'-dimethylpulvinic acid lactone. The lactone is ring opened with propyl mercaptan and sodium hydride to yield the product 4,4'-dimethylthiolpulvinic acid, propyl ester.

EXAMPLE 11

Following the procedure outlined in Example 1, 3,4-methylenedioxyphenylacetonitrile is reacted with diethyl oxalate in alcoholic sodium ethoxide solution to give ethyl-3-cyano-3-(3',4'-methylenedioxyphenyl)-pyruvate which is reacted with phenylacetonitrile to yield 2-(3',4'-methylenedioxyphenyl)-5-phenyl-3,4-dioxoadiponitrile.

A solution of the adiponitrile in water, acetic acid and concentrated sulfuric acid is refluxed for 2 hours and the resulting crude mixture of 3,4- and 3',4'-methylenedioxypulvinic acid is refluxed in acetic anhydride to give 3,4-methylenedioxypulvinic acid lactone.

The lactone is ring opened by mixing it with sodium hydride in diglyme and bubbling methyl mercaptan into the mixture to yield 3,4-methylenedioxythiolpulvinic acid, methyl ester.

EXAMPLE 12

By reacting ethyl-3-cyano-3-(3',4'-methylenedioxyphenyl)-pyruvate with 3,4-methylenedioxyphenylacetonitrile following procedures set forth in Example 1, there is obtained 2,5-di-(3',4'-methylenedioxyphenyl)-3,4-dioxoadiponitrile.

The adiponitrile is refluxed in water, acetic acid and concentrated sulfuric acid to yield 3,4,3',4'-bismethylenedioxypulvinic acid which is treated with acetic anhydride to give 3,4,3',4'-bismethylenedioxypulvinic acid lactone.

EXAMPLE 13

| Ingredients | Mg./Tablet |
| --- | --- |
| Thiolpulvinic acid, methyl ester | 10 |
| Calcium Sulfate, Dihydrate | 150 |
| Sucrose | 25 |
| Starch | 15 |
| Talc | 5 |
| Stearic Acid | 3 |

The sucrose, calcium sulfate and thiolpulvinic acid, methyl ester are thoroughly mixed and granulated with hot 10 percent gelatin solution. The wetted mass is passed through a No. 6 mesh screen directly onto drying trays. The granules are dried at 120° C. and passed through a No. 20 mesh screen, mixed with the starch, talc, and stearic acid, and compressed into tablets.

The lactone is ring opened with ethyl mercaptan and sodium hydride to yield the product 3,4,3',4'-bismethylenedioxythiolpulvinic acid, ethyl ester.

EXAMPLE 14

| Ingredients | Mg./Capsule |
| --- | --- |
| 4-Ethoxythiolpulvinic acid, methyl ester | 50 |
| Magnesium Stearate | 5 |
| Lactose | 350 |

The above ingredients are screened through a No. 40 mesh screen, mixed and filled into No. 0 hard gelatin capsules.

What is claimed is:

1. A pharmaceutical composition having anti-arthritic activity in dosage unit form comprising a pharmaceutical carrier and from about 10 mg. to about 50 mg. of a chemical compound of the formula:

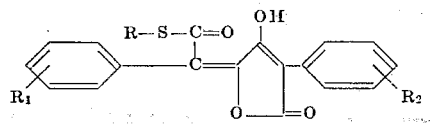

wherein:
R is lower alkyl of from 1 to 4 carbon atoms, phenyl, or benzyl; and
$R_1$ and $R_2$ are each hydrogen, chlorine, bromine, fluorine, phenyl, trifluoromethyl, methylenedioxy in adjacent positions, lower alkyl of from 1 to 4 carbon atoms, or lower alkoxy of from 1 to 4 carbon atoms.

2. A method of producing anti-arthritic activity which comprises administering internally to animals in need of arthritic relief an amount sufficient to produce said activity a chemical compound of the formula:

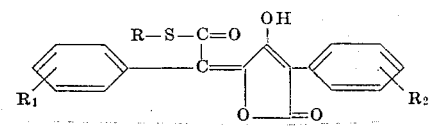

wherein:
R is lower alkyl of from 1 to 4 carbon atoms, phenyl, or benzyl; and
$R_1$ and $R_2$ are each hydrogen, chlorine, bromine, fluorine, phenyl, trifluoromethyl, methylenedioxy in adjacent positions, lower alkyl of from 1 to 4 carbon atoms, or lower alkoxy of from 1 to 4 carbon atoms.

* * * * *